United States Patent
Lundberg et al.

(10) Patent No.: US 12,423,510 B2
(45) Date of Patent: Sep. 23, 2025

(54) METHOD AND APPARATUS FOR GENERATING A DOCUMENT AND DATA PROCESSING

(71) Applicant: Black Hills IP Holdings, LLC, Minneapolis, MN (US)

(72) Inventors: Steven W. Lundberg, Edina, MN (US); Elliott M. Higgins, Vadnais Heights, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 0 days.

(21) Appl. No.: 18/137,685

(22) Filed: Apr. 21, 2023

(65) Prior Publication Data
US 2023/0342540 A1    Oct. 26, 2023

Related U.S. Application Data

(60) Provisional application No. 63/345,616, filed on May 25, 2022, provisional application No. 63/333,524, filed on Apr. 21, 2022.

(51) Int. Cl.
*G06F 40/174* (2020.01)
*G06F 40/186* (2020.01)
*G06F 40/279* (2020.01)

(52) U.S. Cl.
CPC .......... *G06F 40/174* (2020.01); *G06F 40/186* (2020.01); *G06F 40/279* (2020.01)

(58) Field of Classification Search
CPC ..... G06F 40/174; G06F 40/279; G06F 40/186
See application file for complete search history.

(56) References Cited

U.S. PATENT DOCUMENTS

| | | | | | |
|---|---|---|---|---|---|
| 5,754,939 | A | * | 5/1998 | Herz | H04N 21/4622 348/E7.071 |
| 5,915,001 | A | * | 6/1999 | Uppaluru | H04L 67/02 704/270.1 |
| 6,047,327 | A | * | 4/2000 | Tso | G06F 16/958 709/219 |
| 6,269,369 | B1 | * | 7/2001 | Robertson | G06Q 10/025 |
| 6,459,913 | B2 | * | 10/2002 | Cloutier | H04W 4/12 379/211.01 |
| 6,501,832 | B1 | * | 12/2002 | Saylor | H04M 3/4938 379/88.19 |
| 7,127,232 | B2 | * | 10/2006 | O'Neil | G06Q 30/04 705/40 |
| 7,133,869 | B2 | * | 11/2006 | Bryan | H04L 67/55 707/999.102 |
| 7,143,118 | B2 | * | 11/2006 | Eichstaedt | H04N 21/41407 715/255 |

(Continued)

*Primary Examiner* — Nicholas Augustine
(74) *Attorney, Agent, or Firm* — Schwegman Lundberg & Woessner, P.A.

(57) ABSTRACT

A method and apparatus for generating a document and data processing are described herein. An indication of an application number is received. An indication of a document template type is received. Data is received from a repository. A selection of a customer is received. Elements are extracted from the data that is useful for assembling a document. A document shell is assembled at least in part from the elements. The elements are automatically updated throughout the document shell when changes are made in a truth source.

18 Claims, 13 Drawing Sheets

(56) References Cited

U.S. PATENT DOCUMENTS

| | | | |
|---|---|---|---|
| 2002/0042846 A1* | 4/2002 | Bottan | H04L 9/40 709/227 |
| 2002/0065884 A1* | 5/2002 | Donoho | H04L 9/40 709/224 |
| 2002/0087740 A1* | 7/2002 | Castanho | G06Q 10/107 719/318 |
| 2002/0090934 A1* | 7/2002 | Mitchelmore | H04L 67/10 455/412.2 |
| 2003/0110262 A1* | 6/2003 | Hasan | H04L 69/329 709/226 |
| 2003/0131073 A1* | 7/2003 | Lucovsky | G06F 21/6245 709/219 |
| 2003/0225683 A1* | 12/2003 | Hill | G06Q 10/06 705/37 |
| 2004/0002972 A1* | 1/2004 | Pather | G06F 9/542 |
| 2004/0078464 A1* | 4/2004 | Rajan | G06Q 30/02 709/224 |
| 2005/0027741 A1* | 2/2005 | Eichstaedt | G06F 9/542 |
| 2005/0144266 A1* | 6/2005 | Antonelli | H04L 9/40 709/223 |
| 2013/0047066 A1* | 2/2013 | Lee | G06F 16/93 715/229 |
| 2016/0350886 A1* | 12/2016 | Jessen | G06Q 50/184 |
| 2020/0210603 A1* | 7/2020 | Schick | G06F 40/166 |

* cited by examiner

Recent Document Shells

| Name | Application Number | Last Modified | | |
|---|---|---|---|---|
| 12345678_Final_20120131 | 12345678 | Apr 3, 2023, 2:57 PM | ↧ | 🗑 |
| 15929514_NotFinal_20230331 | 15929514 | Apr 3, 2023, 1:54 AM | ↧ | 🗑 |
| 15733852_NotFinal_20230331 | 15733852 | Apr 3, 2023, 1:23 AM | ↧ | 🗑 |
| 15178384_Final_20230331 | 15178384 | Apr 3, 2023, 12:53 AM | ↧ | 🗑 |
| 17017980_Final_20230331 | 17017980 | Apr 3, 2023, 12:24 AM | ↧ | 🗑 |

Records per page: 10 ▾ 1-5 of 5

Automations

| Email | Template | |
|---|---|---|
| Jane.doe@email.com | Rejection Response | 🗑 |

Records per page: 10 ▾ 1-1 of 1

Header Information

| Inventor(s) | Examiner |
|---|---|
| Inventor | Examiner |
| Application No | Group Art Unit |
| 12345678 | |
| Filed | Docket No |
| December 30, 2008 | 1.017PRV |
| Confirmation No | Title |

RESPONSE TO OFFICE ACTION UNDER 37 C.F.R§ [1.116]
[Mail Stop AF]
Commissioner for Patents
P.O. Box 1450
Alexandria, VA 22313-1450

Applicant has received the [Final] Office Action dated [January 31, 2012] Please [enter the following Amendments and] consider the accompanying Remarks.
This response is accompanied by a Petition, as well as the appropriate fee, to obtain a_month extension of the period for responding to the Office Action, thereby moving the deadline for response from _____ to _____.

--------Page break--------

Claims Checker
Please Ensure the claims are correct

Claim 1 (Previously Presented)

902

An optical system used in a barcode scanner for reading a barcode of a product, the optical system comprising a light source, a standing cylinder lens, a focusing lens, a non-focusing lens, reflector means and a linear sensor array arranged on one same plane, wherein:
said light source is adapted to emit a light beam through said standing cylinder lens directly onto a barcode of a product;
said focusing lens is adapted to focus an image reflected by the barcode of the product, upon which the light beam emitted by said light source through said standing cylinder lens onto said reflector;
said reflector means is adapted to reflect the image focused by said focusing lens onto said linear sensor array for reading; and
wherein:
the light beam sequentially travels from said light source, said standing cylinder lens, the barcode, said focusing lens and said reflector means to said linear sensor array so that the light path of the image focused by said focusing lens onto said reflector and the light path of the image reflected by said reflector onto said linear sensor array are overlapped, forming a light path overlap region.

Claim 2 (Original)

The optical system as claimed in claim 1, wherein said light source is comprised of a laser diode and a collimator.

*Interview Summary*

The undersigned thanks #examiner[Joe Johnson] for the courtesy of a telephone interview on

1002 ↘

| examinerName |
| Joe Johnson |
| References_Cited By Examiner_date |
| January 31, 2012 |
| References_Cited By Examiner_USPatentDocuments |
| A US-6, 137,105 A 10-2000 250/234 B US-6,629,641 B2 10-2003 235/... |
| References_Cited By Examiner_ForeignPatentDocuments |
| N O P Q R S T |

Please amend the claims 1. (Previously Presented) ... a product, the optical sys[tem]... a non-focusing lens, refle[ctor]... wherein: said light source is adapt[ed]... a barcode of a product;

...ading a barcode of ...ns, a focusing lens, ...ne same plane, ...er lens directly onto

FIG. 10

METHOD AND APPARATUS FOR GENERATING A DOCUMENT AND DATA PROCESSING

CLAIM OF PRIORITY

This application claims the benefit of priority under 35 U.S.C. § 119(e) to U.S. Provisional Patent Application Ser. No. 63/345,616, filed on May 25, 2022, and to U.S. Provisional Patent Application Ser. No. 63/333,524, filed on Apr. 21, 2022, each of which is incorporated by reference herein in its entirety.

TECHNICAL FIELD

Embodiments described herein generally relate to electronic document assembly and, in some embodiments, more specifically to electronic document assembly using data extracted from a plurality of electronic data sources.

BACKGROUND

Certain legal processes require the creation of documents which often follow a predictable format. Creating such documents can require extracting information from prior documents or data involved in the process and combining it with boilerplate text and text that is unique to the document. The sources of these various components of the document can be located in multiple different areas, requiring significant effort during drafting.

SUMMARY OF THE DISCLOSURE

According to an example embodiment, a document generating tool executing on a digital computer provides a computer implemented method and machine to enable faster, more accurate, more efficient, and better-informed process control in a legal process, for example, patent prosecution. This is accomplished in one example embodiment by generating "Document Shells" based on the type of document needed, prior documents filed, and other information about the patent application. The application also provides a location to access and view information related to the current application, with smart filters that prioritize displaying data based on the document shell currently loaded. An application user interface is provided to enable an autosave capability, allowing a user to return to a document shell at any point from any device by logging into the application. The finished document shell can be downloaded as a MICROSOFT® word docx file. The file can also be output to a portable document format (PDF) or a button can be embedded in the document shell to automatically file the document directly to a patent office if a valid login was provided for an electronic filing application of the patent office.

Currently, the approach for these legal processes can be inefficient due to the time required to gather information from various sources in order to assemble a document. In the process of drafting, data such as dates, names, or company-wide boilerplate text, for example, can be located in multiple documents stored in various locations. Considerable time can be spent gathering such basic information before beginning to draft the document.

The current process for updating claims in a patent, for example, can also be inefficient for a variety of reasons. The status of a claim depends on whether the claim itself was included in the original application, previously presented in an office action response, or amended at some point in the prosecution process, for example. Manually tracking the status of claims is time consuming and increases the likelihood for error.

The method and system described herein automates the creation and assembly of documents. Preset templates, boilerplates, and annotations are stored in a data structure of the user application which are used repeatedly in a legal process for easy access when drafting. Annotations are automatically customized based on information contained in the patent application. Commonly used boilerplates are available for the user to customize and save for use with future documents. By storing preset and customized portions of a document within the application, the time needed to create and assemble a document is decreased. Efficiency is increased because a user will not have to manually customize annotations with information located in various documents. Efficiency is increased further by the ability to store manually, customized boilerplate text which can be used in future documents. Preset and customized document portions enables the computer to assemble a document more quickly without the added processor cycles used in manual document creation tasks that can include search, copy, paste, and other document preparation computing tasks. In addition, source documents can be compressed upon data collection because they are no longer readily needed to assemble documents resulting in reduced computer storage medium utilization.

A further benefit of the application is the creation of a central location for all documents relating to a patent application. This aids in efficiency because a user can execute the legal process within one program without having to access additional documents or information stored elsewhere.

Additionally, automatically keeping track of patent claim statuses and patent claim amendments increases efficiency and decrease errors. The user does not have to reference prior claim sets to determine whether they are original, previously presented, amended, canceled, or new. Various sections of a document which reference claim sets are automatically updated, which decreases the possibility of inconsistencies throughout the document. Automatically ensuring the claims are accurately and consistently referenced removes the possibility of user error when claims are amended, canceled, or added.

BRIEF DESCRIPTION OF THE DRAWINGS

FIG. 4 depicts a schematic of a user interface for use with document generating tool, in an example.

FIG. 5 depicts a schematic of a user interface for use with document generating tool, in an example.

FIG. 6 depicts a schematic of a user interface for use with document generating tool, in an example.

FIG. 7 depicts a schematic of a user interface for use with document generating tool, in an example.

FIG. 8 depicts a schematic of a user interface for use with document generating tool, in an example.

FIG. 9 depicts a schematic of a user interface for use with document generating tool, in an example.

FIG. 10 depicts a schematic of a user interface for use with document generating tool, in an example.

DETAILED DESCRIPTION

Figure 1:
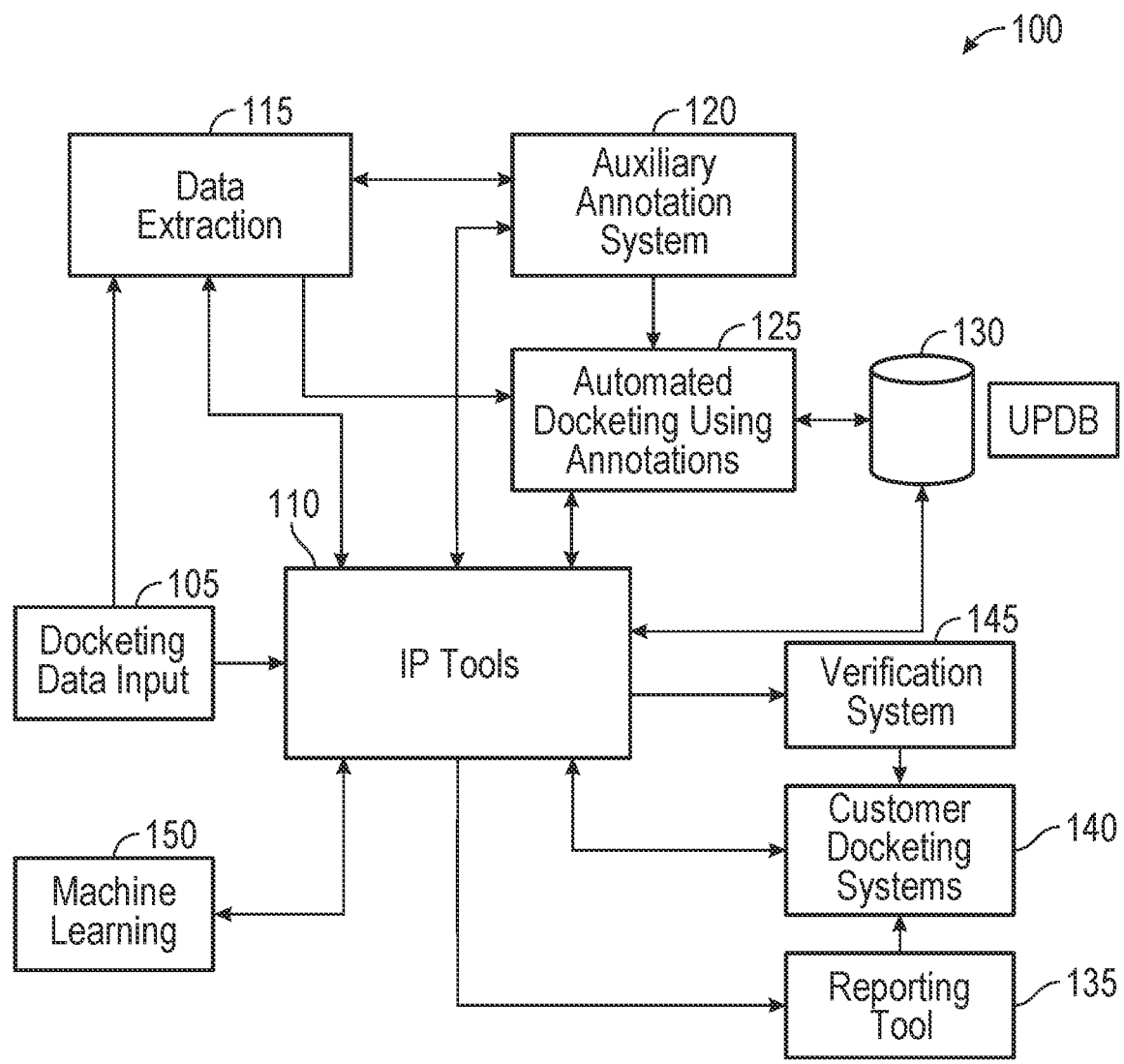
FIG. 1 depicts a schematic of an automated patent docketing system, in an example.

The population of document shells is accomplished by using a number of existing templates, combined with logic based on the given document type (e.g., a response to a non-final office action, etc.), along with proprietary annotations gathered from the existing documents, and real time data from the patent center to populate as much as possible in the shell. This leaves only the sections that require further articulation to be written by the user.

Existing templates are used as section headers and include "boilerplate" text such as introductory paragraphs that do not change from application to application. These are combined with "Annotations" which are locations in the document where data is dynamically injected into the template where text can change from application to application, but in a predicable manner. For example, automatically changing a paragraph to include a current date, a name of and examiner or inventor, or information about any documents already in the data structure of the application. This includes dates of when documents were filed, contents of the documents (e.g., populating the shell with a most recent copy of the claims, etc.), or sections of an office action.

The annotations themselves are loaded in real time; at the moment the document is loaded. The annotations are pulled directly from the patent center in most cases, but auxiliary annotations are pulled from an internal system that assists to analyze and categorize the document, as well as pull key information out of a given document (e.g., a mailing date, due date, rejected claims in an office action. etc.).

Annotations follow a single source of truth approach (e.g., a truth source), meaning that if the annotation is modified in one section, that change will be reflected throughout the document without any intervention from the user needed. For example, if a new claim was added in a response to a non-final rejection, a new claim number appears as a new claim in the summary and in a section detailing the new claim itself.

A claims feature includes additional functionality beyond standard annotations. An extensible markup language (XML) copy of the claims is retrieved electronically from the patent office and the claims are embedded into the document shell to be edited by the user. The status of the claims is automatically updated when this happens. For example, if the previous copy had currently amended claims, the claims are now be labeled as previously presented. If a user edits a claim, the status is automatically updated to reflect this change, the claim number is added to the remarks summary as a currently amended claim, and anywhere else in the document that the list of currently amended claims appears. Similar functionality is triggered and executed if a claim is canceled or a new claim is added.

The individual sections of the shell are dynamically chosen based on the specifics of the a subject document. By using an XML copy of office action documents from the patent center, sections can be chosen intelligently. As a non-limiting example, a response to specification objections "boilerplate" can be automatically added if a specification objections section appears in the rejection from a patent office. The text from the rejection can also be dynamically added into the boilerplate and edited in a similar manner to the claims.

FIG. 1 is a block diagram of an automated docketing system 100, in an example. The automated docketing system 100 can be automated or semi-automated. The automated docketing system 100 can include docketing data input 105, a docketing manager 110, a data extractor 115, auxiliary annotation system (AAS) 120, an automated docketing annotator 125, a universal procedures database (UPDB) 130, a reporting tool 135, a customer docketing system 140, a verification system 145, and a machine learning processor 150.

The automated docketing system 100 can receive documents from third party sources including third party docketing systems and/or customer data as docketing data input 105. The docketing manager 110 can process the received documents to provide to the customer docketing systems 140 and prepare the documents for data extraction by the data extractor 115 as needed.

The data extractor 115 can perform Optical Character Recognition (OCR) on the received documents from the docketing manager 110 to extract data, read checkboxes, extract lists, and identify documents where possible. The docketing manager 110 can also integrate with the UPDB 130 to provide automated docketing by the automated docketing annotator 125 that processes received documents based on the additional annotations added to the documents based on the complex data extraction performed by the AAS 120.

The AAS 120 can identify the received documents without using an OCR. To manage this process, the docketing manager 110 can receive frequent updates of docketing procedure rules including configuration data and updates the UPDB 130 with universal procedure codes (UPCs) as appropriate. The UPCs can be used in conjunction with customer specific codes, checklists, and templates. The rules can specify how to fill in the templates and how to complete customer-specific procedures such as how to docket documents into the customer docketing system 140, for example. The template can be filled out by pulling in attributes from the annotations in a document.

The docketing manager 110 can receive or intake documents and docketing data from several different sources of docketing data input 105, validate the docketing items against entries in the customer docketing system 140, and communicate those documents to the customer docketing system 140 via a unified interface. The docketing manager 110 can also route documents and associated docketing data through the data extractor 115 and the AAS 120 and organizes the returned metadata and annotations. The docketing manager 110 provides a breakout between the metadata and the document text.

The docketing manager 110 can also keep records and communicate with third-party application programming interfaces (APIs) to push the docketing data and documents automatically where allowed. In an example, the docketing manager 110 can present the documents to human docket staff to docket the documents. The docketing manager 110 can issue reports upon request.

The docketing manager 110 can be integrated with the customer docketing system 140 that can be an existing system e.g., FOUNDATION semi-integrated (e.g., CPI, ANAQUA®, etc.), can provide a virtual host that does not talk at all to the customer docketing system 140 (e.g., IP Manager, MEMOTECH™), or can provide outputs in spreadsheet form for use by a docketing administrator to update the customer docketing system 140.

If the docketing manager 110 and the customer docketing system 140 are not integrated, the data output of automated docketing system 100 can be presented to a human docket administrator for manual entry. For example, the human docket administrator can implement macros that interface with the customer docketing system 140 to populate the received data into the customer docketing system 140.

In an example, if the docketing manager 110 and the customer docketing system 140 are integrated or semi-integrated, the data output can be processed to determine if any data is missing to automate the docketing process. If anything is missing, the human docket administrator can add that information before the automated docketing process is proceed further or the data can be automatically populated and mapped to a template from the UPDB 130.

The automated docketing system 100 can also perform several post-docketing actions, such as sending docketing reports/details to an external verification system 145 that use a set of rules to verify proper docketing in a host system. The verification system 145 can verify that the data is correctly added to the external customer docketing system 140. For example, the verification system 145 can pull data from the AAS 120, the docketing manager 110, and the customer docketing system 140 to compare what is present to what is expected to be present in the respective systems.

The automated docketing system 100 can provide automated email "report out" notifications to customers by implementing the reporting tool 135 that specifies docketing actions based on UPDB 130 template configurations. The reporting tool 135 can provide completed docketing reports to customers either directly or via the customers docketing system 140.

In some cases, machine learning techniques can be used to generate annotations. For example, a database of past documents that have been identified can be provided by the docketing manager 110 and used as a data warehouse to train and improve machine learning models by creating a training set for a machine learning model trained by the machine learning processor 150. Over time, the machine learning processor 150 can learn which patent office identifiers to use for which documents, which document in a bundle of documents can be used to characterize the bundle, and can provide predicted patent office identifiers for the received documents. The machine learning processor 150 can establish rule engine prediction capabilities for received documents that test the classifications.

Figure 2:
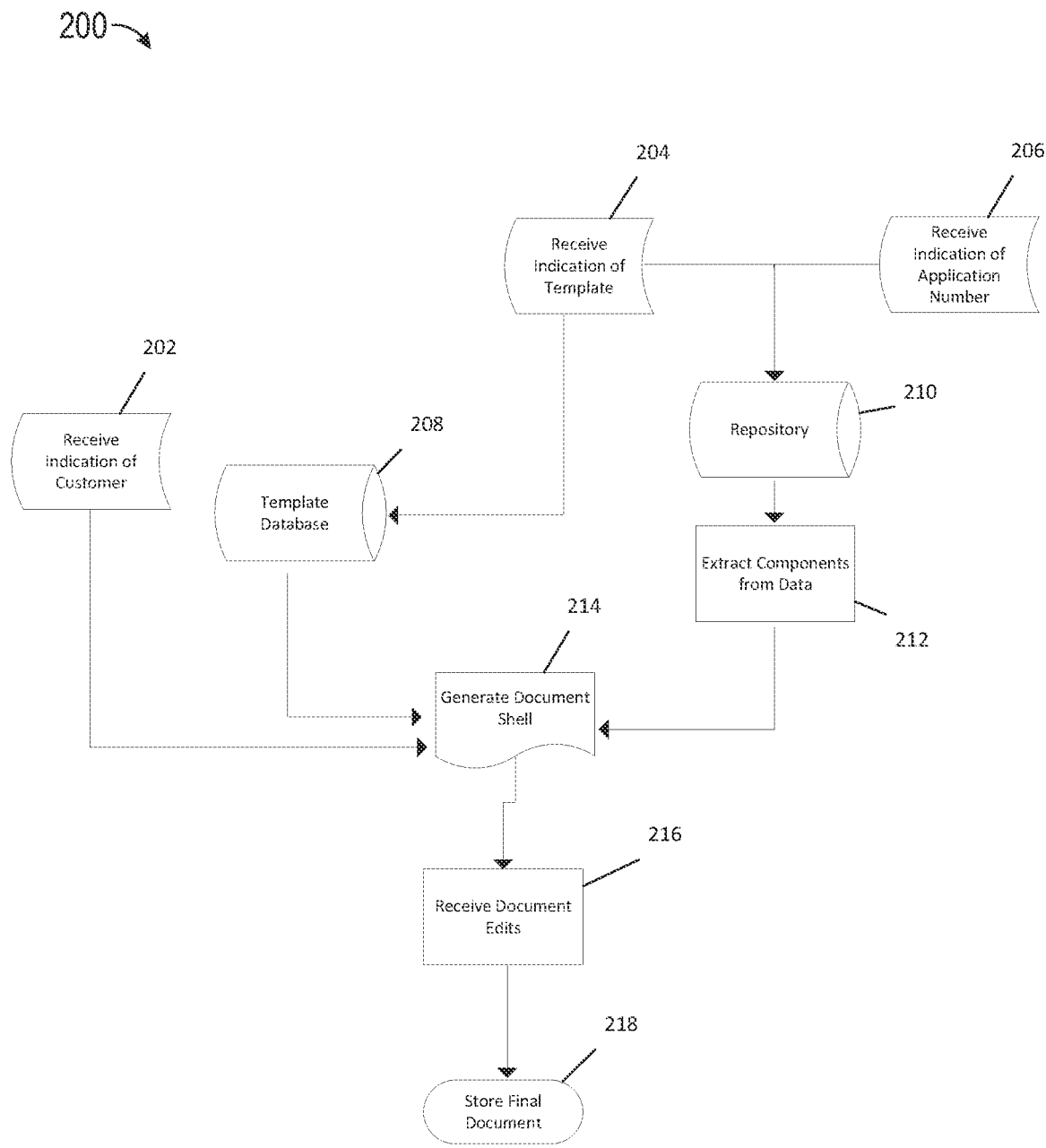
FIG. 2 depicts a method of assembling a document shell, in an example.

FIG. 2 is a flow chart of method 200 for generating a new document shell, in an example. Indications are received from a user which prompt the scraping of repositories and formatting of the new document shell.

At operation 202, a user indicates within a user interface the name of the customer. A customer can be, for example, a law firm.

At operation 204, a user will indicate, within the user interface, a template for the new document shell. A template is a document containing sections in a predetermined layout but does not yet contain text customized based on the patent application number and data found in a repository. The template can be, for example, a rejection response template or preliminary amendment template.

At operation 206, the user indicates, within the user interface, the application number for the matter to which the new document shell applies. The patent application number can be, for example, a number assigned by a national patent office to the patent application upon filing.

The template database 208 is a database that stores templates. When an indication of a desired template is received at operation 204, the template database 208 selects the indicated template for generating the new document shell.

The repository 210 is scraped for data relating to the matter indicated by the patent application number. The repository 210 can be an internal system, or it can be an official government database such as the US Patent Office. Data scraped from the repository 210 can include communications from a patent office, communications to a patent office, or other documents relating to a patent application, for example.

At operation 212, data elements from data found in the repository 210 are extracted. The extracted data elements can include boilerplate sections, proprietary annotations, and claims, for example. The data elements can be sections of documents that change based on the application number and template type, but in a predictable manner.

At operation 214, the new document shell is generated. The template pulled from template database 208 dictates the layout of the new document shell, such as the order of headers. For example, a template can include an interview summary, followed by a remarks section, followed by a conclusion.

The new document shell created at operation 214 uses the customer indication received at operation 202 to customize the template indicated at operation 204 by inserting the customer name in applicable areas throughout the new document shell.

The new document shell created at operation 214 uses the data elements extracted at operation 212 from data located in the repository 210 to further customize the new document shell. For example, claims and proprietary annotations are added to the new document shell in the locations dictated by the document template.

At operation 216, the user is presented with user interfaces. The user can edit components (e.g., data elements, fields, etc.) and text of the document. For example, boilerplate sections can be added, removed, or customized; claims and claim status can be updated; and annotations can be added or customized.

At operation 218 the document generating tool can store the final version of the document. In an embodiment, the document generating tool can also submit the document directly to a patent office on behalf of the user.

Figure 3:
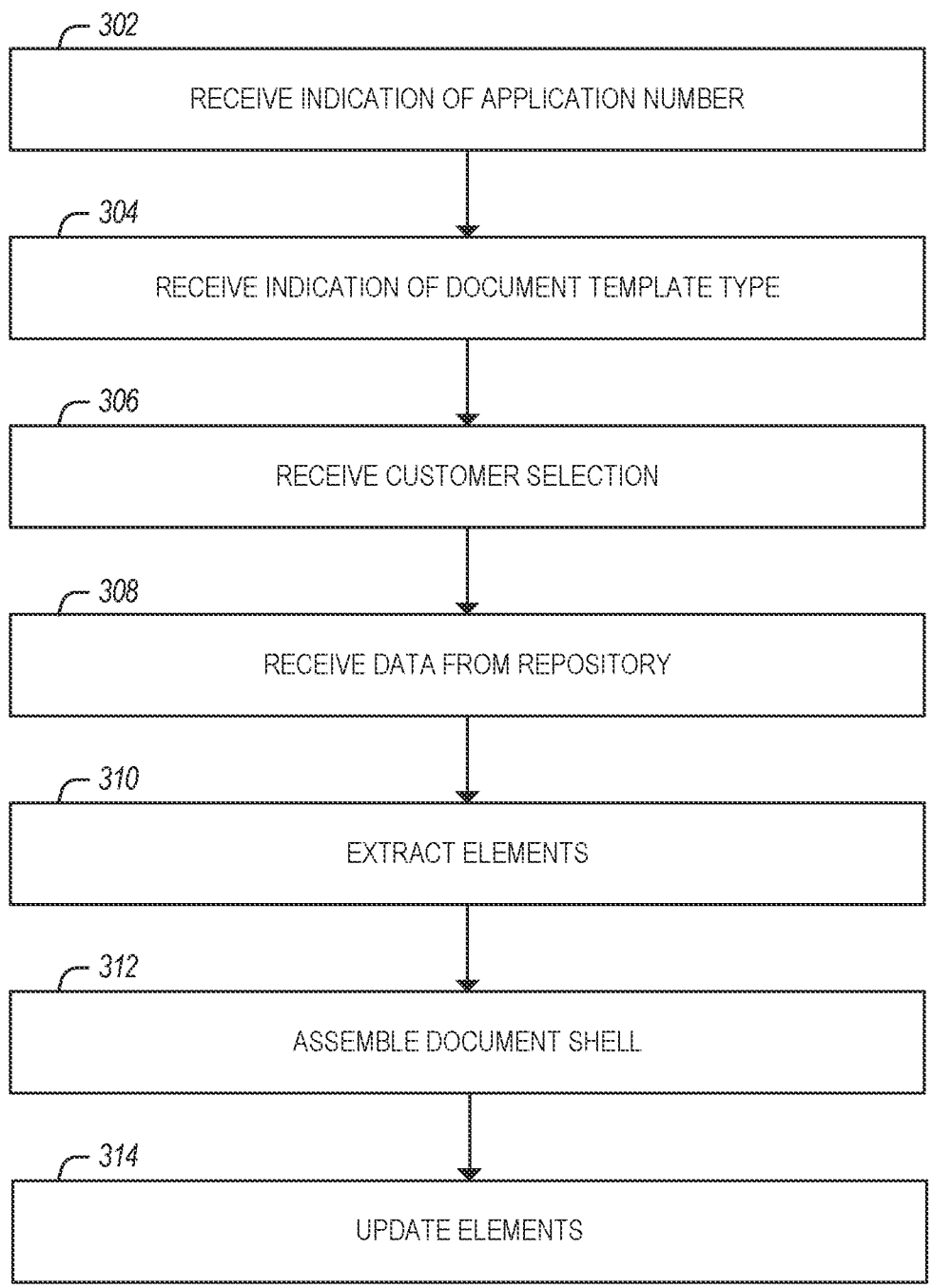
FIG. 3 illustrates flow diagram of an example of a method for document generation, according to an embodiment.

FIG. 3 illustrates an example of a method 300 for document generation, according to an embodiment.

At operation 302 an indication of an application number is received. At operation 304, an indication of a document template type is received. At operation 306, a selection of a customer is received. In an example, the application number is associated with the matter to which the new document shell applies. In an example, the template type can be a rejection response or a preliminary amendment.

At operation 308, data is received from a repository. In an example, the repository is scraped for data associated with the application number. In an example, the repository can be an internal system or an official government database.

At operation 310, elements are extracted from the data that is useful for assembling the document. In an example, the data elements can be sections of a document which change based on the application number and template type, but in a predictable manner. In an example, extracting the elements comprises referencing data from the repository to dynamically identify boilerplate sections, proprietary annotations, and claims from data located in the repository. In an example, the data from a repository is associated with the application number. In an example, the proprietary annotations can be dates, names, file numbers, applications numbers, or portions of another document.

At operation 312, a document shell is assembled at least in part from the elements. In an example, the document shell is customized based on template type, data elements, and customer name. In an example, the elements can be incorporated into the document shell at predetermined locations and updating a status of claims. In an example, the document shell can include the document template type customized based on data from the repository. In an example, the predetermined locations can be identified based on data located in the repository and the indication of the document template type. In an example, the status of claims is currently amended, previously presented, original, new, or canceled.

At operation 314, the elements are automatically updated throughout the document shell when changes are made in a truth source. In an example, the truth source can be an identified proprietary annotation that is referenced to autofill portions of the document shell. In an example, changes made by a user in the truth source are duplicated to other portions of the document shell which reference the changes made by a user. In an example, the document generating tool receives edits from a user within a user interface and the document generating tool updates proprietary annotations throughout the document when edits are made in the truth source. For example, an edit made in user interface 700 will be reflected in all areas of the document which reference an annotation from that interface.

In an example, the document is saved by a user. In an alternative embodiment, the document can be uploaded to an official government database.

In an alternative embodiment, method 300 can include assembling a document shell based on an automation element which is generated through an indication of a customer name and a template type. Automations are saved for the user and can be accessed from a user interface.

FIG. 4 depicts a schematic of a user interface 400 for a document generating tool, in an example. The user interface 400 can be a user interface landing page for the document generating tool. A user can either select a previously saved document from a recent document shell list 404 or select the new shell button 402 to create a new document shell. User interface 400 also lists the user automations 406.

The recent document shell list 404 displays documents that the user recently accessed in the application. As an example, the recent document shell list 404 displays a document name, an application number, a template ID, and a date the document was last modified for the documents in the recent document shell list 404. The recent document shell list 404 enables the user to download or delete a recent document shell. The new shell button 402 allows the user to begin creating a new document shell or a new automation.

The user automations 406 are automation elements for document shells that a user has previously saved. User automations 406 can also include other documents which are referenced to create the automation. For or example, a nonfinal rejection response automation can include a rejection from the patent office and previously filed claims.

Automations can be downloaded to a user computing device from the user interface 400. When the automation is downloaded, a list of references associated with the rejection from the patent office or other information can be included.

Figure 5:
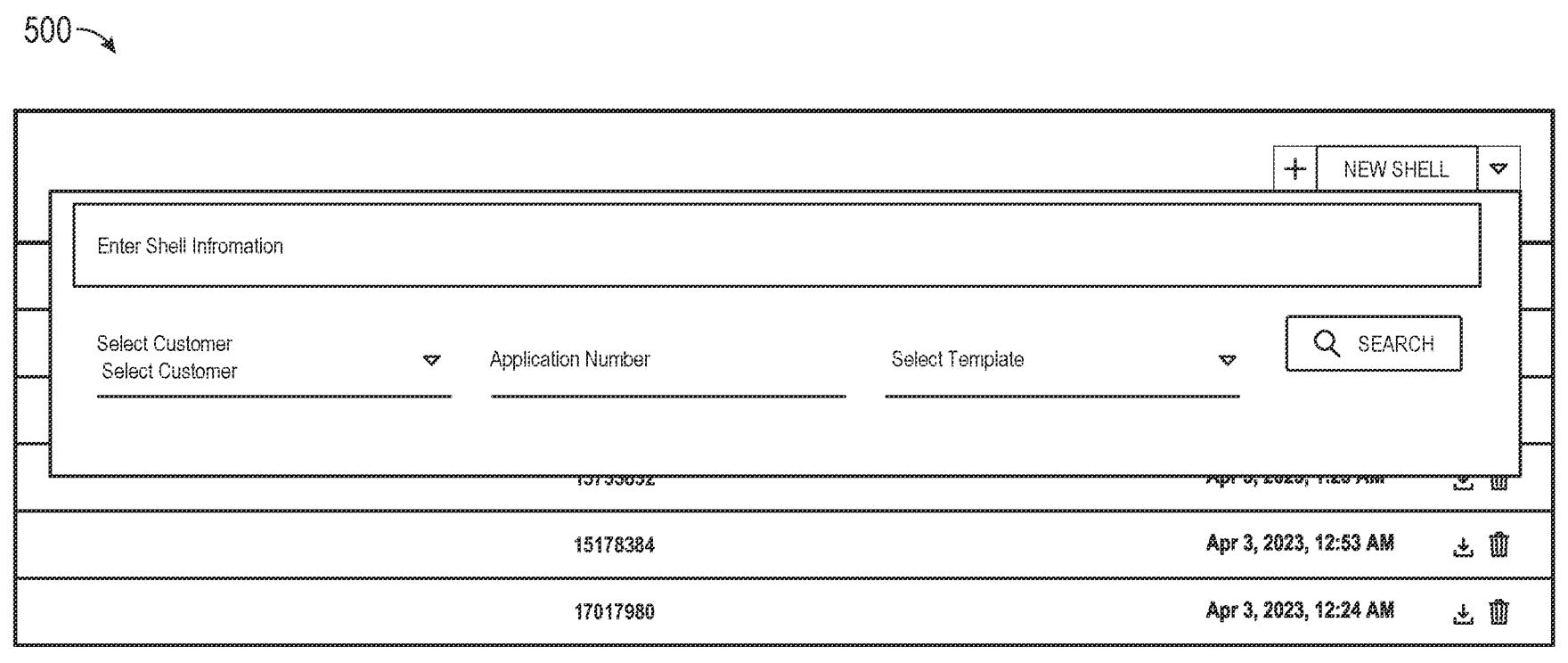

FIG. 5 depicts a schematic of a user interface 500 for a document generating tool, in an example. The user interface 500 enables a user to select a customer name, enter an application number, and select a template for a new document shell. The application number and customer name are dynamically inputted into the new document shell immediately when the new document shell is generated. A selection of templates are stored that a customer can use, for example, a rejection response template or a preliminary amendment template.

Alternatively or additionally, a user can select a down arrow next to a new shell button to load an automation. The user can indicate a customer name and template for the new automation.

Figure 6:
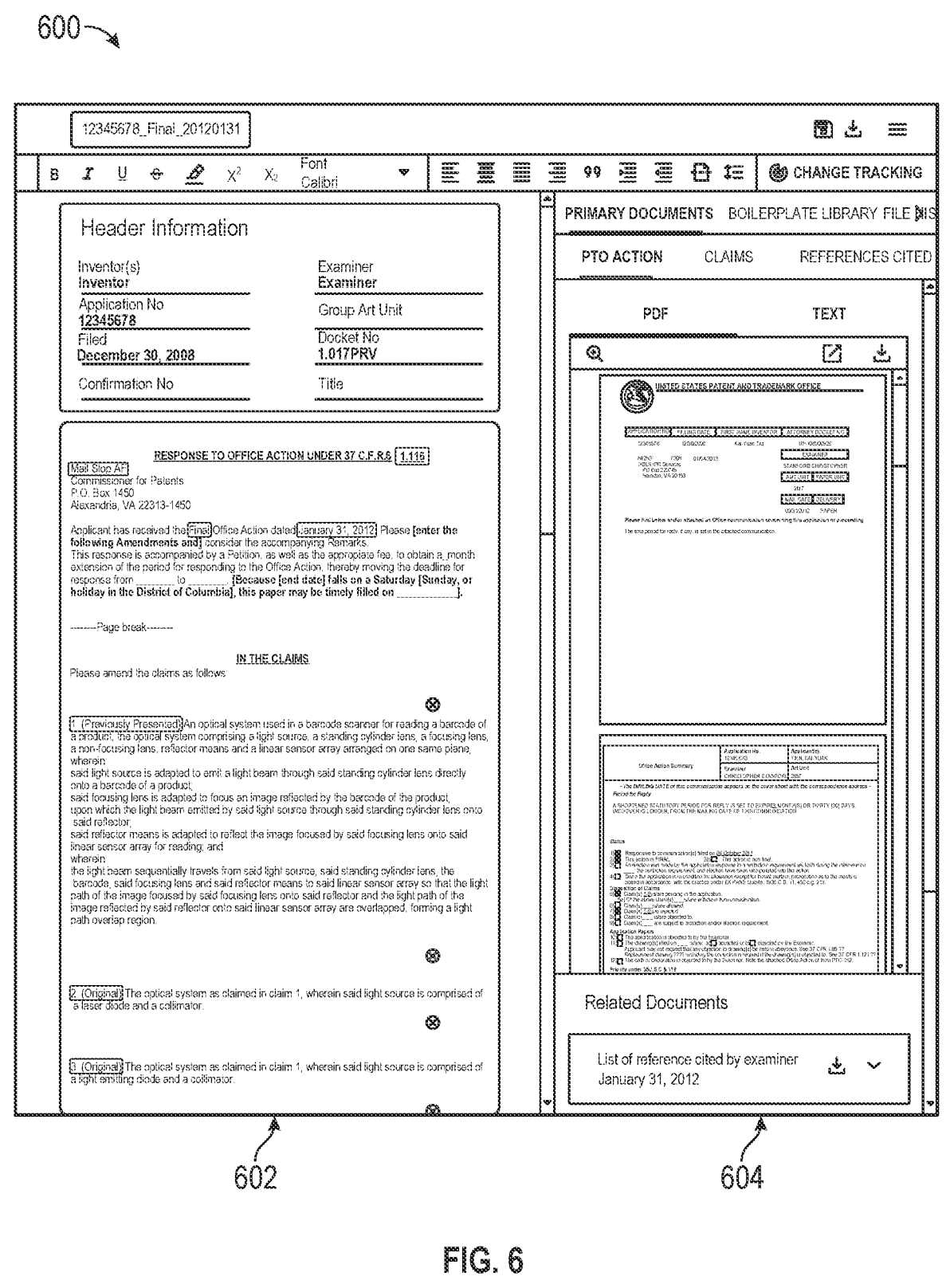

FIG. 6 depicts a schematic of a user interface 600 for a document generating tool, in an example. The user interface 600 can be, for example, a user interface home page for the document generating tool. A document shell 602 is displayed on the left side and the side panel 604 is displayed on the right side.

The document shell 602 enables a user to edit text, cancel claims, and view boilerplate sections or annotations that have been added to the document shell 602. The document shell 602 is customized based on an application number, a template type, and a customer name. The document shell 602 includes data elements extracted from data located in a repository. The side panel 604 provides additional information and actions to aid the user in filling out the finished document after the shell has been generated. In another embodiment, the document shell 602 can be a previously saved user automation.

The side panel 604 operates as a central location to view and download information related to the current application, with smart filters which prioritize data based on the document shell currently loaded. For example, if the document shell 602 is a non-final office action response, side panel 604 will load references cited in the non-final office action, among other documents.

FIG. 7 depicts a schematic of a user interface 700 for a document generating tool, in an example. The user interface 700 can be, for example, a window containing header information for a document shell (e.g., the document shell 602 as described in FIG. 6, etc.). Values displayed in this portion are annotations that are dynamically filled based on the patent application. Any changes made in user interface 700 are reflected throughout the document.

FIG. 8 depicts a schematic of a user interface 800 for a document generating tool, in an example. The user interface 800 is an example of a boilerplate section displayed in document shell (e.g., the document shell 602 as described in FIG. 6, etc.). The statute section, mail to name, type of office action, and date are examples of annotations that have been extracted from related documents. These annotations are automatically inserted when the document shell is loaded.

FIG. 9 depicts a schematic of a user interface 900 for a document generating tool in an example. The user interface 900 presents a claims checker interface to a user the first time that a document shell (e.g., the document shell 602 as described in FIG. 6, etc.) is loaded. The current claims for the document are listed for the user to review and edit before the document shell is loaded.

For each claim listed in user interface 900, a claim status 904 and a text box 902 is presented. Claim status 904 can be updated based on whether the claim is original, amended, previously presented, or canceled. The claim status 904 can be determined based on data extracted from a repository such as a government database or an internal system, for example.

The user can edit text in text box 902. Adjacent to text box 902 can be a PDF document containing a list of claims as they were previously presented in an official communication with a patent office. For example, if the document shell being loaded in this instance is a final office action, the PDF document contains the list of claims as they were previously presented in a non-final office action response.

Text box 902 is presented to give the user an opportunity to ensure that the document generating tool has accurately transcribed the claims from previous official communication with a patent office. Sometimes PDF communications that have been submitted to a patent office will have gone through an OCR process. The OCR process can result in inconsistencies in text. The user interface 900 presents an opportunity for the user to detect these inconsistencies and correct them. Edits made in text box 902 will be translated to the document shell.

FIG. 10 depicts a schematic of a user interface 1000 for a document generating tool, in an example. A user can access a selection of annotations from within a document shell. For example, the user can press the "#" key and then begin to type the desired annotation. A drop-down list 1002 containing the available annotations that match the a search term entered by a user is presented. A name or text of the annotation can be searched using this method. In an example, to insert the name of an examiner, the user types "examiner name" or starts typing "Joe . . . " to be able to select the annotation.

In another embodiment, the side panel 604 includes a tab listing all annotations available to be used in the document shell. The user can copy annotations from this tab into the document shell.

Figure 11:
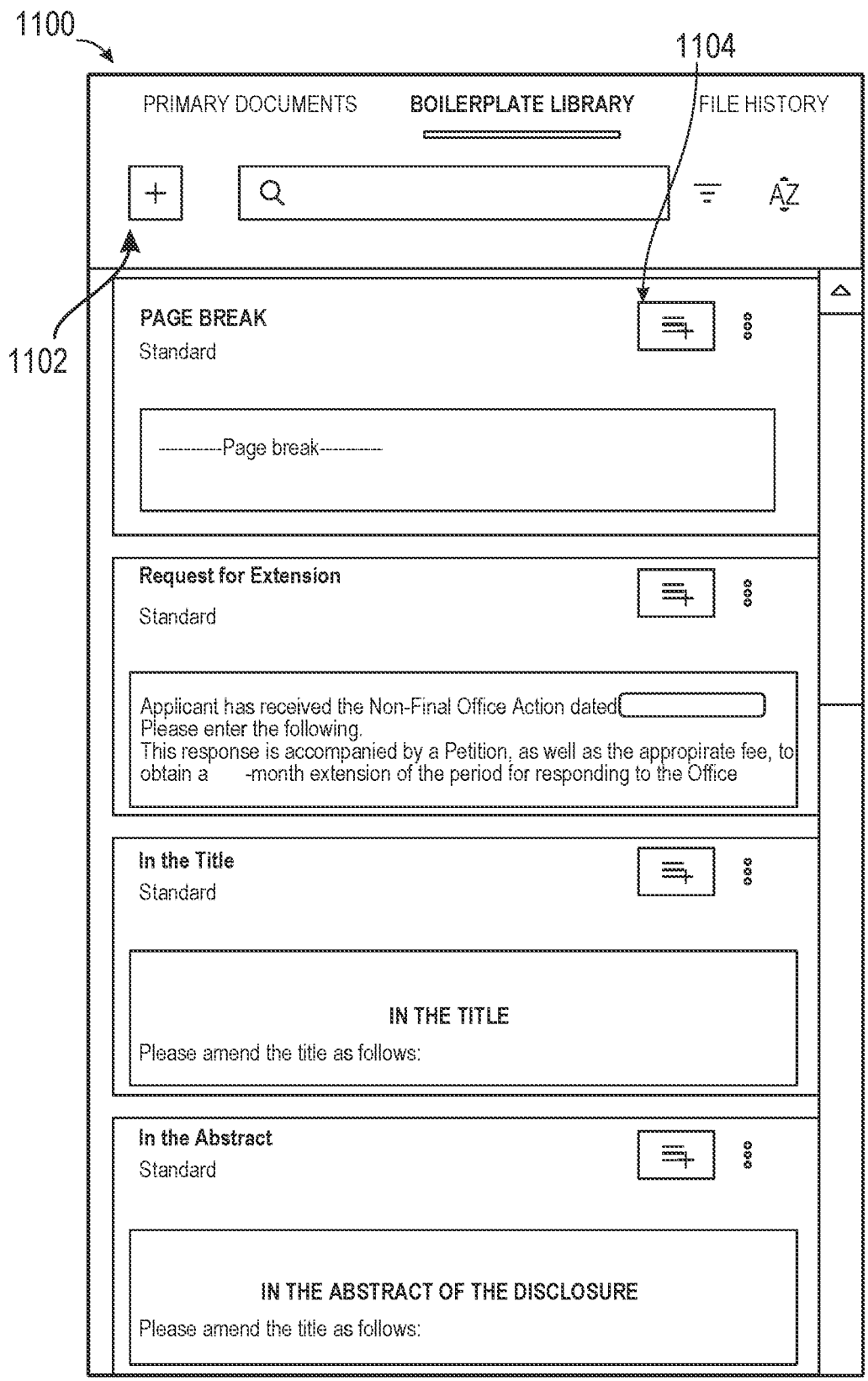
FIG. 11 depicts a schematic of a user interface for use with document generating tool, in an example.

FIG. 11 depicts a schematic of a user interface 1100 for a document generating tool, in an example. User interface 1100 is located in a side panel display and can be a library containing boilerplate sections. The user can select which boilerplate sections are added to the document shell. Applicable sections are automatically listed for the selected document type, but the user can add different sections with the add section button 1104 or remove sections at their discretion by deleting them in the document shell (e.g., the document shell 602 as described in FIG. 6, etc.).

Boilerplate sections displayed in user interface 1100 can be modified by the user in the document shell to reflect customizations to the defaults. When the user loads a document shell that a customized boilerplate section is applicable to, the customized version of that boilerplate section is used instead of the default.

The user can add a custom boilerplate section in the user interface 1100 by using the add boilerplate button 1102. When the user loads a document shell, the custom boilerplate section is presented as an option for the new document.

The boilerplate sections listed in the user interface 1100 can be edited as plain text, as well as by adding dynamic annotations into them. Boilerplate sections can be edited by setting conditions for when they are automatically added into a document and selecting the types of documents a boilerplate section is applicable to. For example, with company-managed user accounts the custom boilerplate sections can be set at a company-wide level, allowing any users within that company to use the company specific boilerplate sections as opposed to the default boilerplate sections.

Figure 12:
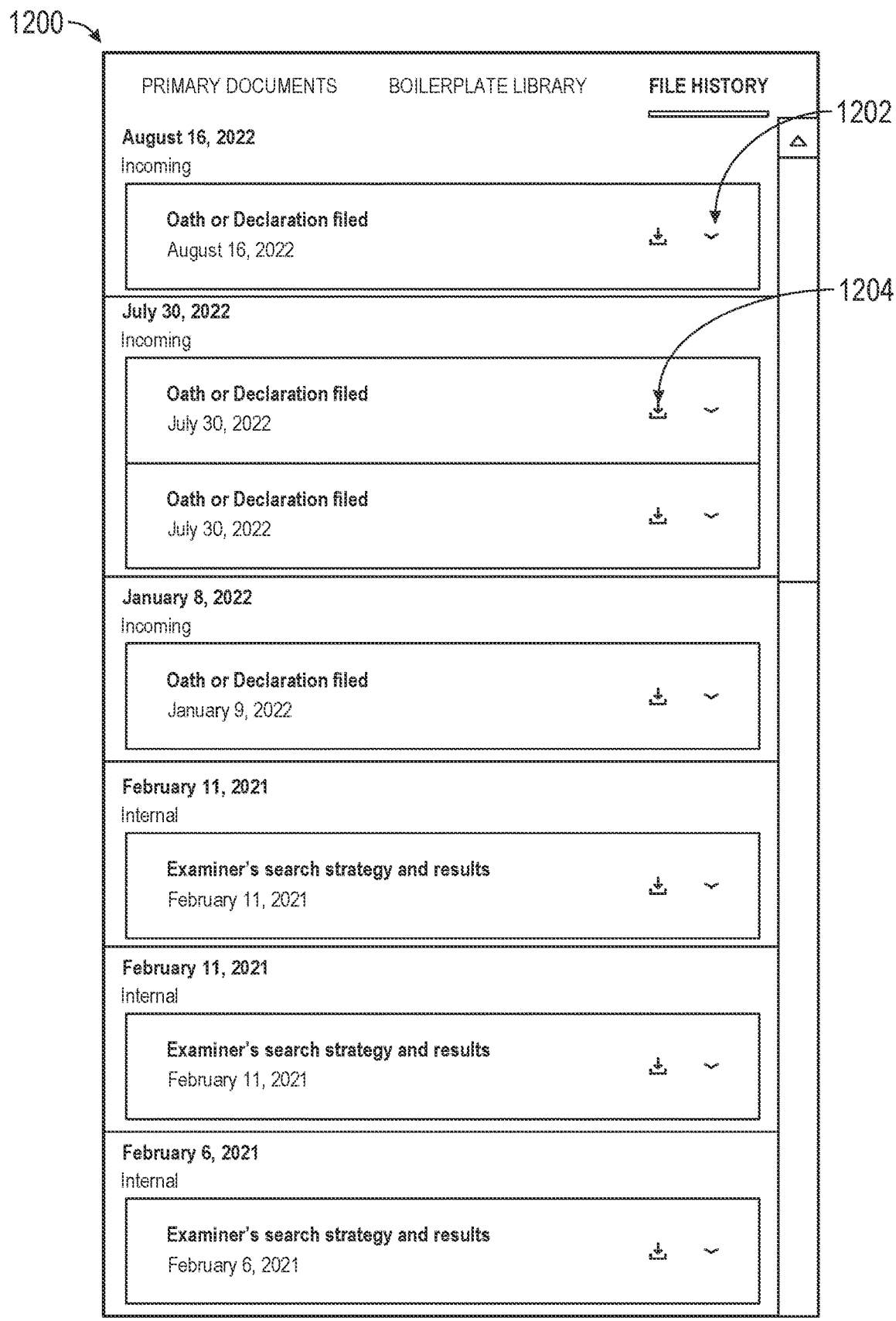
FIG. 12 depicts a schematic of a user interface for use with document generating tool, in an example.

FIG. 12 depicts a schematic of a user interface 1200 for a document generating tool in an example. The user interface 1200 can be a history of documents which pertain to a document shell (e.g., the document shell 602 as described in FIG. 6, etc.). User interface 1200 is located in a side panel display. The documents listed in user interface 1200 are determined by the indication of a patent application number (e.g., as received at user interface 500, etc.).

User interface 1200 includes incoming, outgoing, and internal documents, for example.

By clicking on the down arrow 1202, the user can view a PDF copy of the document or a copy of the plain text of the document, filled either from the XML from the patent center, or from an OCR copy. This allows text to be copied directly from the other documents into a document shell (e.g., the document shell 602 as described in FIG. 6, etc.). The PDF copy of the document can be downloaded by clicking the download button 1204. In another embodiment, a file history tab can list all key annotations extracted from the document.

Figure 13:
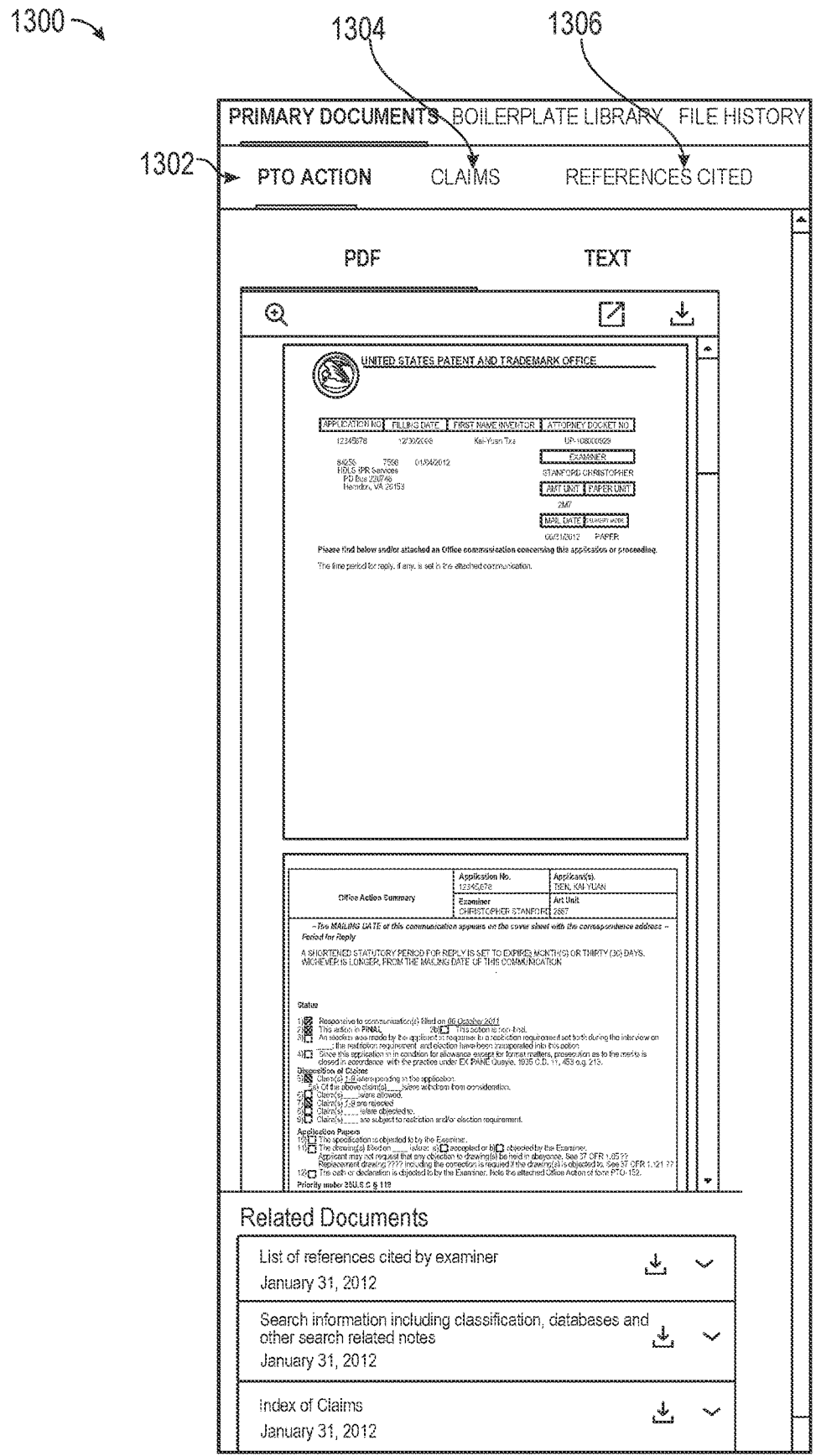
FIG. 13 depicts a schematic of a user interface for use with document generating tool, in an example.

FIG. 13 depicts a schematic of a user interface 1300 for a document generation tool, in an example. In an example, the user interface 1300 is located in a side panel display of a user interface. In an example embodiment, the user interface 1300 automatically shows important documents pertaining to the current document. User interface 1300 contains three sections; PTO action 1302, claims 1304, and references cited 1306.

Under PTO action 1302, for example, an entire copy of a rejection from a PTO can be viewed, as well as any documents that came across with the rejection, such as references cited. These documents are accessed in a similar manner to the history of documents in user interface 1200, with PDF copies, plain text, and key annotations.

Claims 1304 located in user interface 1300 shows a PDF version and a plain text version of the claims as they were most recently amended. Related documents such as applicant arguments/remarks made in an amendment are listed under the claims document. The claims document as well as related documents can be downloaded in PDF format.

Similarly, references cited 1306 located in user interface 1300 shows a PDF version and a plain text version of the references cited by the PTO. Other related documents are displayed in this section.

Figure 14:
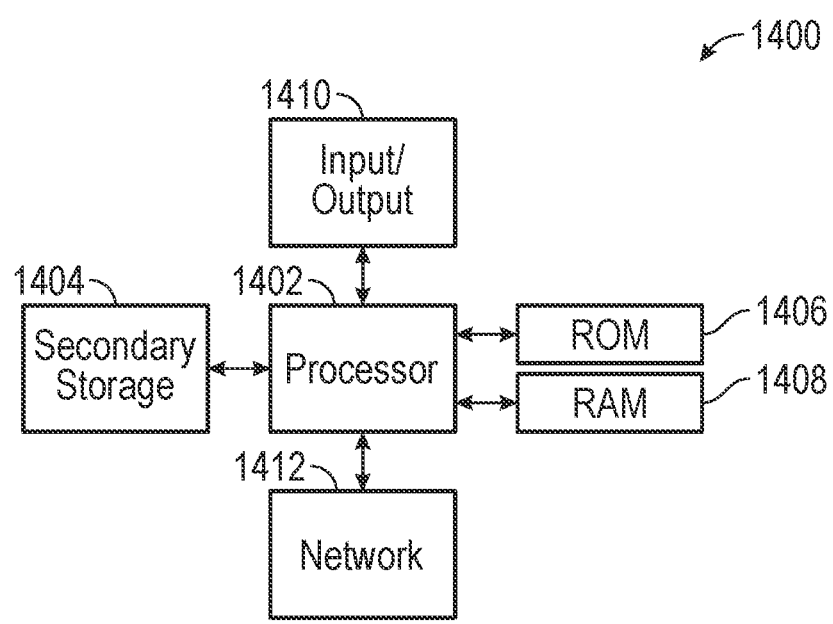
FIG. 14 is a block diagram illustrating an example of a machine upon which one or more embodiments can be implemented.

FIG. 14 is a block diagram illustrating an example of a machine 1400 upon which one or more embodiments can be implemented. The machine 1400 can be programmed into a special purpose computer suitable for implementing one or more embodiments of system disclosed herein. The system described above can be implemented on any general purpose processing component, such as a computer with sufficient processing power, memory resources, and communications throughput capability to handle the necessary workload placed upon it. The machine 1400 includes a processor 1402 (which can be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor 1402 can be implemented as one or more CPU chips or can be part of one or more application specific integrated circuits (ASICs).

The secondary storage 1404 is typically comprised of one or more disk drives or tape drives and is used for non-volatile storage of data and as an over-flow data storage device if RAM 1408 is not large enough to hold all working data. Secondary storage 1404 can be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

The devices described herein can be configured to include computer-readable non-transitory media storing computer-readable instructions and one or more processors coupled to the memory, and when executing the computer-readable instructions configure the machine 1400 to perform method steps and operations described above. The computer-readable non-transitory media includes all types of computer-readable media, including magnetic storage media, optical storage media, flash media, and solid-state storage media.

It should be further understood that software including one or more computer-executable instructions that facilitate processing and operations as described above with reference to any one or all of steps of the disclosure can be installed in and sold with one or more servers and/or one or more routers and/or one or more devices within consumer and/or producer domains consistent with the disclosure. Alternatively, the software can be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings, Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them, These components can be implemented, for example, as a computing program product such as a computing program, program code or computer instructions tangibly embodied in an information carrier, or in a machine-readable storage device, for execution by, or to control the operation of, data processing apparatus such as a programmable processor, a computer, or multiple computers.

A computing program can be written in any form of programming language, including compiled or interpreted languages, and it can be deployed in any form, including as a stand-alone program or as a module, component, subroutine, or other unit suitable for use in a computing environment. A computing program can be deployed to be executed on one computer or on multiple computers at one site or distributed across multiple sites and interconnected by a communication network. Also, functional programs, codes, and code segments for accomplishing the techniques described herein can be easily construed as within the scope of the present disclosure by programmers skilled in the art. Method steps associated with the illustrative embodiments can be performed by one or more programmable processors executing a computing program, code or instructions to perform functions (e.g., by operating on input data and/or generating an output). Method steps can also be performed by, and apparatus can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein can be implemented or performed with a general-purpose processor, a digital signal processor (DSP), an AMC, a FPGA or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

Processors suitable for the execution of a computing program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carders suitable for embodying computing program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those of skill in the art understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the disclosure. A software module can reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium can be integral to the processor. In other words, the processor and the storage medium can reside in an integrated circuit or be implemented as discrete components.

As used herein, "machine-readable medium" means a device able to store instructions and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

What is claimed is:

1. A method for assembling a document comprising:
receiving an indication of an application number;
receiving an indication of a document template type;
receiving a selection of a customer;
receiving data from a repository;
extracting elements from the data useful for assembling the document;
assembling a document shell at least in part from the elements, wherein assembling the document shell comprises:
determining a plurality of annotations based on the elements;
designating one or more of the plurality of annotations as a source annotation;
identifying a selection of document portions, wherein each document portion contains at least one reference annotation referencing the one or more source annotations; and
configuring the one or more source annotations such that when a source annotation is modified in the document shell, the modification is automatically duplicated to each reference annotation contained in the plurality of document portions;
receiving an indication that an edit to one or more source annotations has been made by the user; and
in response to receipt of the indication, automatically duplicating the edit to each reference annotation contained in each document portion.

2. The method of claim 1, wherein the repository is an internal system or an official government database.

3. The method of claim 1, wherein extracting the elements comprises referencing data from the repository to dynamically identify boilerplate sections, the plurality of annotations, document portions, and claims from data located in the repository, wherein the data from a repository is associated with the application number.

4. The method of claim 3, wherein the plurality of annotations include dates, names, file numbers, applications numbers, or portions of another document.

5. The method of claim 1, wherein the one or more source annotations are extracted and displayed separately from the document shell within the user interface for receiving edits.

6. The method of claim 1, wherein assembling the document shell comprises incorporating the elements into the document shell at predetermined locations and updating a status of claims.

7. The method of claim 6, wherein the document shell comprises the document template type customized based on data from a repository.

8. The method of claim 6, wherein the predetermined locations are identified based on data located in the repository and the indication of the document template type.

9. The method of claim 6, wherein the status of claims is currently amended, previously presented, original, new, or canceled.

10. A system for assembling a document comprising:
at least one processor; and
memory comprising instructions that, when executed by the at least one processor, cause the at least one processor to perform operations to:
receive an indication of an application number;
receive an indication of a document template type;
receive a selection of a customer;
receive data from a repository;
extract elements from the data useful for assembling the document;
assemble a document shell at least in part from the elements, wherein the instructions to assemble the document shell include:
determining a plurality of annotations based on the elements;
designating one or more of the plurality of annotations as a source annotation;
identifying a selection of document portions, wherein each document portion contains at least one reference annotation referencing the one or more source annotations; and
configuring the one or more source annotations such that when a source annotation is modified in the document shell, the modification is automatically duplicated to each reference annotation contained in the plurality of document portions;
receive an indication that an edit to one or more source annotations has been made by the user; and
in response to receipt of the indication, automatically duplicate the edit to each reference annotation contained in each document portion.

11. The system of claim 10, wherein the repository is an internal system or an official government database.

12. The system of claim 10, wherein the instructions to assemble the document shell comprises instructions to incorporate the elements into the document shell at predetermined locations and update a status of claims.

13. At least one non-transitory computer-readable medium comprising instructions that, when executed by at least one processor, cause the at least one processor to perform operations to:
    receive an indication of an application number;
    receive an indication of a document template type;
    receive a selection of a customer;
    receive data from a repository;
    extract elements from the data useful for assembling a document;
    assemble a document shell at least in part from the elements, wherein the instructions to assemble the document shell include:
        determining a plurality of annotations based on the elements;
        designating one or more of the plurality of annotations as a source annotation;
        identifying a selection of document portions, wherein each document portion contains at least one reference annotation referencing the one or more source annotations; and
        configuring the one or more source annotations such that when a source annotation is modified in the document shell, the modification is automatically duplicated to each reference annotation contained in the plurality of document portions;
    receive an indication that an edit to one or more source annotations has been made by the user; and
    in response to receipt of the indication, automatically duplicate the edit to each reference annotation contained in each document portion.

14. The at least one non-transitory computer-readable medium of claim 13, wherein the repository is an internal system or an official government database.

15. The at least one non-transitory computer-readable medium of claim 13, wherein the document shell comprises a document template of the document template type customized based on data from a repository.

16. The at least one non-transitory computer-readable medium of claim 13, wherein the instructions to extract the elements comprises instructions to:
    reference data from the repository to dynamically identify boilerplate sections, the plurality of annotations, document portions, and claims from data located in the repository, and wherein the data from the repository is associated with the application number.

17. The at least one non-transitory computer-readable medium of claim 16, wherein the plurality of annotations include dates, names, file numbers, applications numbers, or portions of another document.

18. The at least one non-transitory computer-readable medium of claim 13, wherein the instructions to assemble the document shell further comprises instructions to incorporate the elements into the document shell at predetermined locations and update a status of claims, the predetermined locations being identified based on data located in the repository and the indication of the document template type.

\* \* \* \* \*